US012646728B2

(12) United States Patent
Kajio

(10) Patent No.: US 12,646,728 B2
(45) Date of Patent: Jun. 2, 2026

(54) HUMIDIFIER

(71) Applicant: AISIN CORPORATION, Kariya (JP)

(72) Inventor: Katsuhiro Kajio, Kariya (JP)

(73) Assignee: AISIN CORPORATION, Kariya (JP)

( * ) Notice: Subject to any disclaimer, the term of this patent is extended or adjusted under 35 U.S.C. 154(b) by 565 days.

(21) Appl. No.: 18/248,660

(22) PCT Filed: Oct. 25, 2021

(86) PCT No.: PCT/JP2021/039258
§ 371 (c)(1),
(2) Date: Apr. 11, 2023

(87) PCT Pub. No.: WO2022/107552
PCT Pub. Date: May 27, 2022

(65) Prior Publication Data
US 2023/0387429 A1      Nov. 30, 2023

(30) Foreign Application Priority Data

Nov. 19, 2020    (JP) ................................. 2020-192201

(51) Int. Cl.
*H01M 8/04119*        (2016.01)
*B01D 63/08*          (2006.01)
(Continued)

(52) U.S. Cl.
CPC ...... *H01M 8/04149* (2013.01); *B01D 63/085* (2013.01); *H01M 8/0258* (2013.01);
(Continued)

(58) Field of Classification Search
None
See application file for complete search history.

(56) References Cited

U.S. PATENT DOCUMENTS

2012/0181712 A1*  7/2012  Vanderwees ...... H01M 8/04141
                                                    261/102
2022/0001336 A1*  1/2022  Auman .................. B01D 65/02

FOREIGN PATENT DOCUMENTS

JP          9-92308 A      4/1997
JP        10-172592 A      6/1998
(Continued)

OTHER PUBLICATIONS

Extended European Search Report issued Apr. 16, 2024, in corresponding European Patent Application No. 21894426.2 7 pages.
(Continued)

*Primary Examiner* — Scott J. Chmielecki
(74) *Attorney, Agent, or Firm* — Oblon, McClelland, Maier & Neustadt, L.L.P.

(57) ABSTRACT

A humidifier that can maintain high sealing performance between a separator and a water exchange membrane without applying an excessive external force to the separator even in the event of temperature change is provided. Humidifying modules each include plate-shaped separators each including a dry gas-side water exchange portion formed on one side and a water-containing gas-side water exchange portion formed on the other side. The humidifying module is structured by stacking a plurality of the separators in a state in which a water exchange membrane is disposed between the dry gas-side water exchange portion and the water-containing gas-side water exchange portion facing each other. A loop-shaped partition member that forms a pressurization space between the adjacent humidifying modules is provided in a state in which the humidifying modules are stacked to guide a fluid into the pressurization space.

6 Claims, 8 Drawing Sheets

(51) Int. Cl.
*H01M 8/0258* (2016.01)
*H01M 8/0276* (2016.01)
*H01M 8/04828* (2016.01)

(52) U.S. Cl.
CPC ..... *H01M 8/0276* (2013.01); *H01M 8/04141* (2013.01); *H01M 8/04835* (2013.01)

(56) References Cited

FOREIGN PATENT DOCUMENTS

| | | |
|---|---|---|
| JP | 3660087 B2 | 6/2005 |
| JP | 2006-4767 A | 1/2006 |
| JP | 2007-163035 A | 6/2007 |
| JP | 2008-282740 A | 11/2008 |

OTHER PUBLICATIONS

International Search Report issued Dec. 28, 2021 in PCT/JP2021/039258 filed on Oct. 25, 2021, 2 pages.

* cited by examiner

HUMIDIFIER

TECHNICAL FIELD

The present disclosure relates to a humidifier.

BACKGROUND ART

An exemplary humidifier for humidifying cathode gas of a fuel cell often has a structure in which separators for guiding gas and membranes through which water permeates are disposed alternately. Patent Document 1 and Patent Document 2 described below can be cited as examples of the humidifier having such a structure.

Patent Document 1 describes a structure in which a plurality of separators and a plurality of humidifying membranes are disposed alternately, a nut, a washer, and a spring are provided on one end side of each of a plurality of threaded rods passing through pressure plates at both ends in a stacking direction, and a pressure is applied to the separators in the stacking direction by an urging force of the spring.

The humidifier described in Patent Document 1 includes a seal portion for preventing leakage of water from the separator, or a separator seal portion for determining the position of the humidifying membrane relative to the separator.

Patent Document 2 describes a structure in which first frames (separators) and second frames are disposed alternately in a stacked state, a humidifying fluid channel is formed at one of positions where a humidifying membrane is disposed between the first and second frames, a humidified fluid channel is formed at the other of the positions, and a manifold communicating with the humidifying fluid channel and a manifold communicating with the humidified fluid channel are formed through the first frame and the second frame in a stacking direction.

In the humidifier described in Patent Document 2, holding plates are disposed at positions between which the plurality of first frames and the plurality of second frames are disposed, nuts are engaged with a plurality of connecting rods passing through the first and second frames in the stacking direction, and the first frames and the second frames are integrated by fastening forces of the nuts. A first seal portion is formed in a region surrounding the outer periphery of the humidifying membrane, and a seal portion is disposed on the outer periphery of an opening that defines each manifold.

RELATED ART DOCUMENTS

Patent Documents

Patent Document 1: Japanese Unexamined Patent Application Publication No. 2007-163035 (JP 2007-163035 A)
Patent Document 2: Japanese Unexamined Patent Application Publication No. 2008-282740 (JP 2008-282740 A)

BRIEF SUMMARY

Problem to be Solved by the Disclosure

Not only in the structures of Patent Document 1 and Patent Document 2 but also in a humidifier including plate-shaped separators each having a water-containing gas-side water exchange portion on one surface and a dry gas-side water exchange portion on the other surface, in which the plurality of separators is positioned so that the water-containing gas-side water exchange portions and the dry gas-side water exchange portions are disposed alternately, and a water exchange membrane (humidifying membrane in Patent Document 1 and Patent Document 2) is disposed at a boundary between the separators, for example, there is a possibility that a force is generated in a direction in which the distance between the water exchange portion and the water exchange membrane increases due to deformation of the separator by a pressure of dry gas and the dry gas leaks from a gap between the separator and the water exchange membrane.

Such an inconvenience may also occur in the channel where water-containing gas is supplied. To suppress the gas leakage, Patent Document 1 provides such a measure that the urging force of the spring is set by operating the nut engaged with the threaded rod. Although the spring is not used, Patent Document 2 provides such a measure that the nut is engaged with the connecting rod and the fastening force is applied as in Patent Document 1. In the structure in which the urging force of the spring or the fastening force is constantly applied as in Patent Documents 1 and 2, however, the action of these forces may adversely affect the separator, leading to an inconvenience in that a large gap is created between the separator and the water exchange membrane.

In this type of humidifier, the separator may thermally expand due to a temperature of supplied cathode gas (basically air) or cathode off-gas (fluid discharged from a fuel cell stack), and a force may be applied in a direction in which a gap is created between the separator and the water exchange membrane (thickness direction of the separator). Further, there is a demand to suppress a decrease in sealing performance due to the effect of the thermal expansion.

For these reasons, there is a need for a humidifier that can ensure sufficient sealing performance between the separator and the water exchange membrane without applying an excessive external force to the separator even in the event of temperature change.

Means for Solving the Problem

A characteristic structure of a humidifier according to the present disclosure is as follows. The humidifier includes a dry gas supply passage through which dry gas flows, a water-containing gas supply passage through which water-containing gas flows, plate-shaped separators each including a dry gas-side water exchange portion formed on one side and communicating with the dry gas supply passage, and a water-containing gas-side water exchange portion formed on the other side and communicating with the water-containing gas supply passage, and humidifying modules in each of which a plurality of the separators is stacked. The humidifying modules each include a water exchange membrane disposed between the dry gas-side water exchange portion and the water-containing gas-side water exchange portion facing each other in the adjacent separators in a state in which the separators are stacked. A loop-shaped partition member that forms a pressurization space between the adjacent humidifying modules is provided in a state in which the humidifying modules are stacked to guide a fluid into the pressurization space.

In the humidifier, the pressures of gas supplied to the water-containing gas supply passage and the dry gas supply passage of the plurality of separators act in a direction in which the separators are deformed and the distance between the separator and the water exchange membrane increases. In this characteristic structure, the fluid is guided into the pressurization space formed by the partition member. Therefore, the fluid pressure can act in a direction in which the plurality of separators constituting the humidifying module and the water exchange membrane are brought into close contact with each other to suppress the deformation of the separators. Thus, there is no such inconvenience that the gap between the separator and the water exchange membrane increases. Since the pressure acting in this way does not decrease even if the relative positional relationship between the separator and the water exchange membrane changes due to thermal expansion or contraction, the distance between the separator and the water exchange membrane can be maintained appropriately. In particular, this characteristic structure allows the fluid to act on a wide surface of the pressurization space. Thus, there is no such inconvenience that a part of the separator is deformed due to a pressure continuously applied to a specific position on the separator as in a structure in which a spring pressure is applied.

Thus, the humidifier is structured such that sufficient sealing performance can be ensured between the separator and the water exchange membrane without applying an excessive external force to the separator even in the event of temperature change.

As a structure added to the above structure, the fluid may be the water-containing gas supplied to the water-containing gas supply passage or the dry gas supplied to the dry gas supply passage.

Accordingly, the pressure can be applied to the plurality of separators and the water exchange membrane in the stacking direction by simply supplying the water-containing gas or the dry gas to the pressurization space without providing a supply source of gas or liquid to be used exclusively for pressurization.

As a structure added to the above structure, the fluid may be the dry gas supplied to the dry gas supply passage.

In the humidifier, dry gas pressurized by a compressor, or the like is supplied to the dry gas supply passage. Therefore, when the dry gas is used as the fluid for pressurization, the pressure of the dry gas can be applied to the plurality of separators and the plurality of water exchange membranes in the stacking direction.

As a structure added to the above structure, the water-containing gas supply passage or the dry gas supply passage may communicate with a pressurization channel through which pressurized gas is supplied to the pressurization space as the fluid.

Accordingly, the gas from the water-containing gas supply passage or the dry gas supply passage can be supplied to the pressurization space as the fluid for pressurization, for example, by communicating the water-containing gas supply passage or the dry gas supply passage with the pressurization channel via a communication passage.

As a structure added to the above structure, the fluid may be pressurized gas different from both the water-containing gas and the dry gas.

Accordingly, high sealing performance can be obtained, for example, by using air pressurized by a compressor as the dedicated pressurized gas to apply a required pressure to the plurality of separators and the water exchange membrane in the stacking direction.

As a structure added to the above structure, the pressurization channel through which the pressurized gas is supplied to the pressurization space may be formed in the separators.

Accordingly, even in a case where a fluid such as dry gas, water-containing gas, external gas, or external liquid is supplied to the pressurization space, the fluid can be supplied to the pressurization space via the pressurization channel formed in the separators. Thus, there is no need to form a channel outside the separators.

As a structure added to the above structure, a discharge portion for discharging the fluid guided to the pressurization space may be formed in the separators.

Accordingly, the fluid supplied to the pressurization space can be discharged to the outside via the discharge portion. In the structure in which the dry gas is supplied to the pressurization space, the dry gas discharged from the discharge portion may be supplied to a dry gas discharge passage, the water-containing gas supply passage, or a water-containing gas discharge passage provided in the separators. Thus, it is possible to reduce a phenomenon in which an excessive pressure is applied to the pressurization space.

As a structure added to the above structure, the partition member may be disposed on an outer surface of the humidifying module and may have a protruding cross section formed by a base portion and a protruding portion.

Accordingly, for example, when a pressure is applied in the vertical direction (stacking direction), the protruding portion is elastically deformed in the compression direction to suppress an inconvenience of significant deformation of the entire partition member. Thus, good sealing performance can be maintained.

MODES FOR CARRYING OUT THE DISCLOSURE

Embodiments of the present disclosure will be described below with reference to the drawings.

[Basic Structure]

Figure 1:
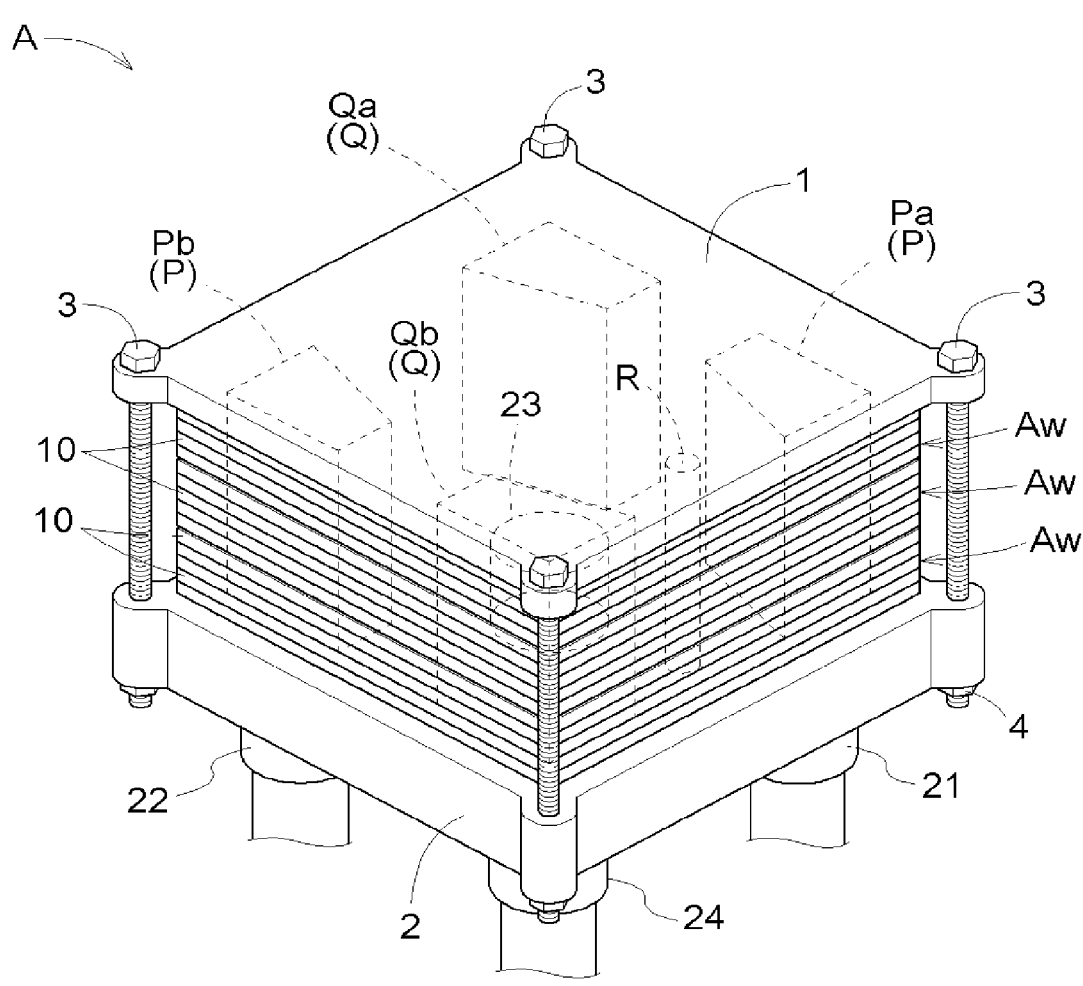
FIG. 1 is a perspective view of a humidifier.

As shown in FIG. 1, a humidifier A is structured by including an upper plate 1 at the upper end, a lower plate 2 at the lower end, a plurality of (three in the embodiments) humidifying modules Aw, a plurality of bolts 3 passing through the upper plate 1 and the lower plate 2, nuts 4 engaged with the bolts 3, dry gas supply passages P, and water-containing gas supply passages Q.

Figure 2:
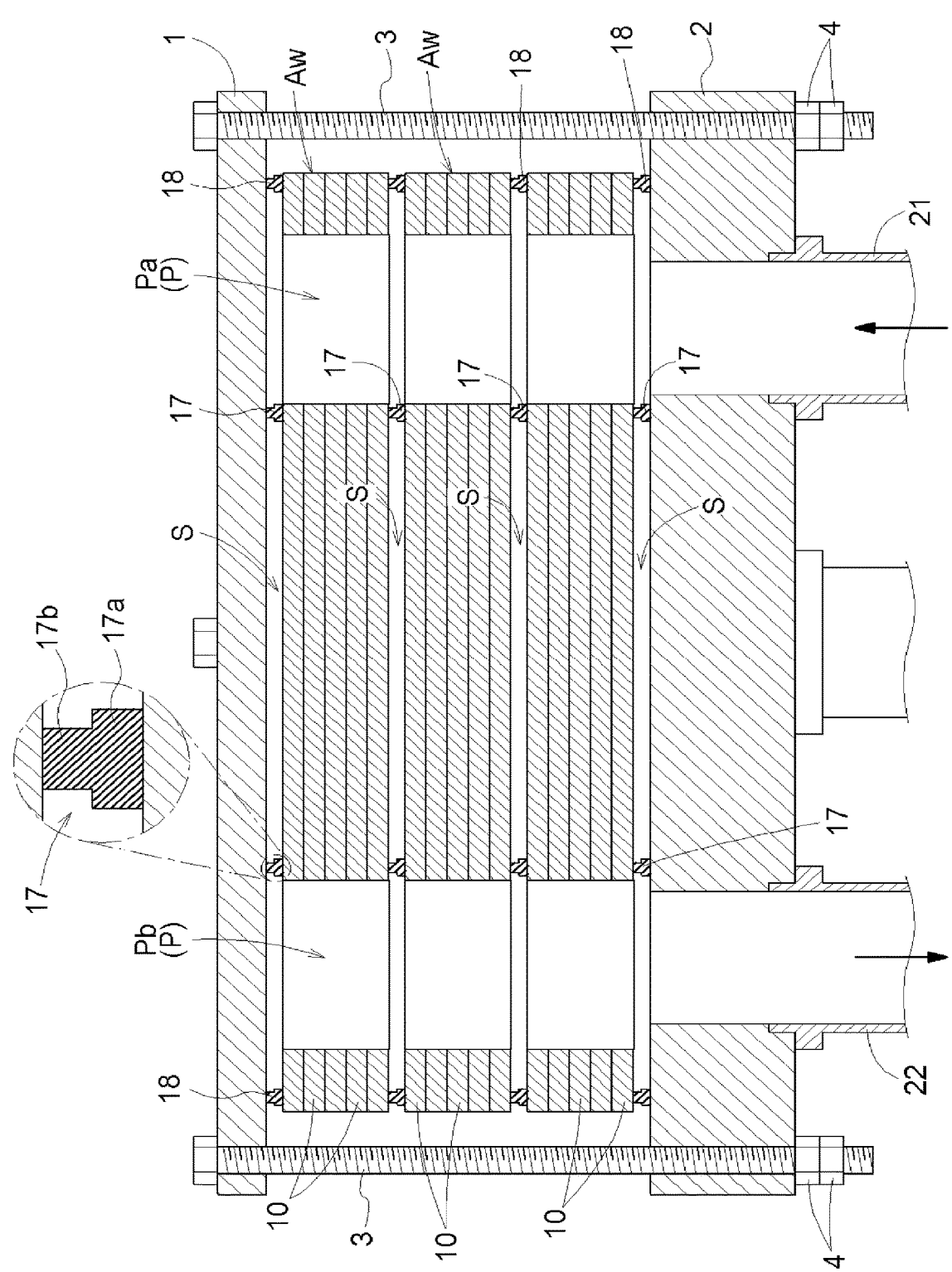
FIG. 2 is a sectional view showing a structure between gas ports of the humidifier.

In the humidifier A, as shown in FIGS. 1 and 2, the plurality of humidifying modules Aw is sandwiched between the upper plate 1 and the lower plate 2, and is integrated by fastening with the bolts 3 and the nuts 4. The humidifying module Aw includes a plurality of stacked separators 10, and has the dry gas supply passages P and the water-containing gas supply passages Q passing through the plurality of separators 10 in their stacking direction.

The humidifier A humidifies air (example of dry gas: sometimes referred to as "cathode gas") to be supplied to a fuel cell cell (not shown) mounted in a vehicle such as an automobile. To realize this humidification, the humidifier A functions such that air containing water after reaction and discharged from the FC cell of the fuel cell (example of water-containing gas: sometimes referred to as "cathode off-gas") is supplied and the water of the cathode off-gas supplied in this way is supplied to the cathode gas. The posture of the humidifier A in use is not limited to the posture shown in FIG. 1. However, the vertical relationship and the like will be described below based on the posture shown in FIG. 1.

[Outline of Gas Supply Passages of Humidifier]

Figure 3:
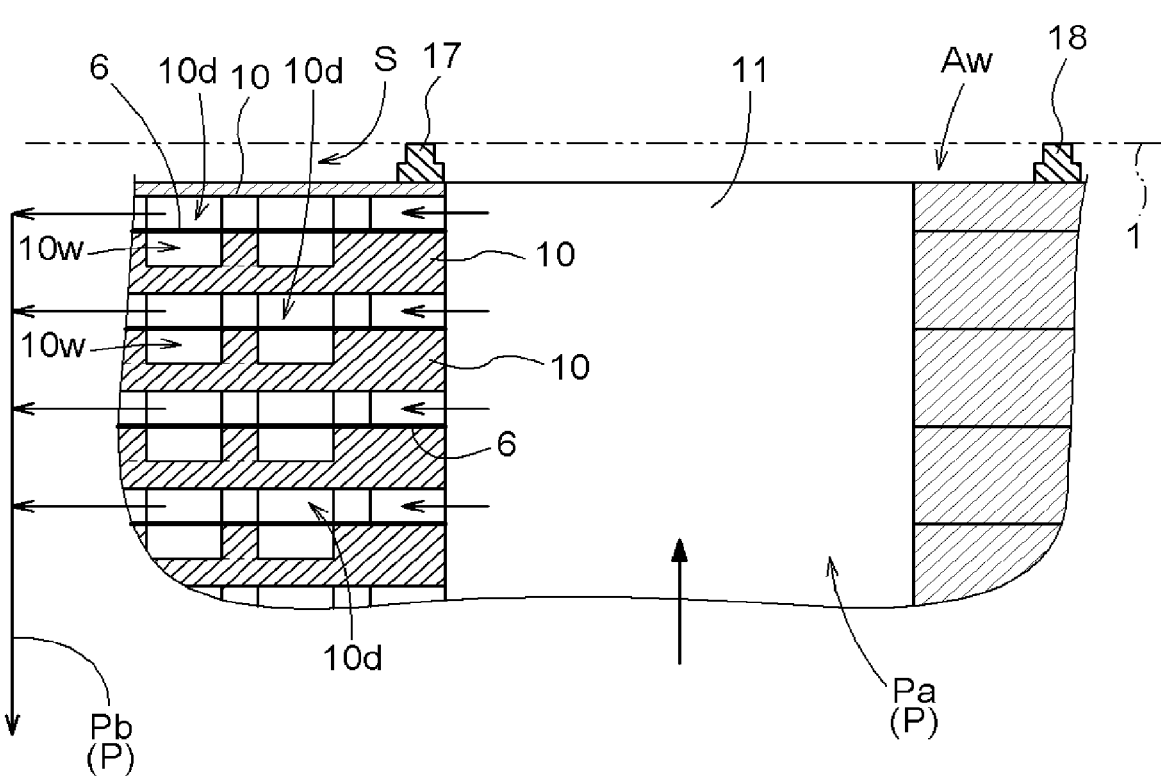
FIG. 3 is a sectional view of a portion of a first dry gas supply passage of separators.

As shown in FIGS. 1 to 3, the dry gas supply passages P include a first dry gas supply passage Pa on an upstream side of dry gas-side water exchange portions 10d of the separators 10, and a second dry gas supply passage Pb on a downstream side of the dry gas-side water exchange portions 10d. The water-containing gas supply passages Q include a first water-containing gas supply passage Qa on an upstream side of water-containing gas-side water exchange portions 10w, and a second water-containing gas supply passage Qb on a downstream side of the water-containing gas-side water exchange portions 10w.

While FIG. 2 shows the first dry gas supply passage Pa and the second dry gas supply passage Pb as the dry gas supply passages P, the humidifier A includes the first water-containing gas supply passage Qa and the second water-containing gas supply passage Qb as the water-containing gas supply passages Q and they communicate with each other via the water-containing gas-side water exchange portions 10w to have a similar structure.

In the present embodiment, the dry gas flowing through the first dry gas supply passage Pa will be referred to as "first dry gas", the dry gas flowing through the second dry gas supply passage Pb will be referred to as "second dry gas", the water-containing gas flowing through the first water-containing gas supply passage Qa will be referred to as "first water-containing gas", and the water-containing gas flowing through the second water-containing gas supply passage Qb will be referred to as "second water-containing gas".

Figure 5:
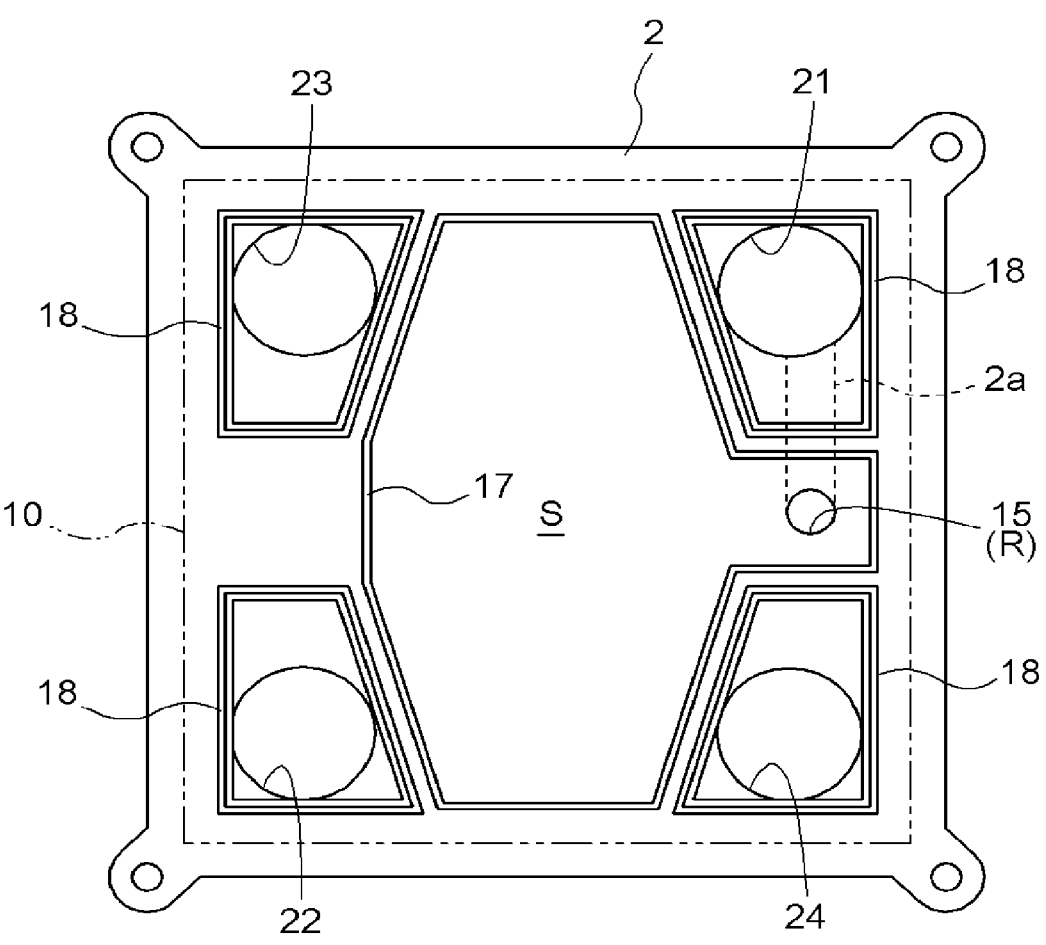
FIG. 5 is a plan view of a lower plate.

As shown in FIGS. 1, 2, and 5, the lower plate 2 includes a first dry gas port 21 communicating with the first dry gas supply passage Pa, a second dry gas port 22 communicating with the second dry gas supply passage Pb, a first water-containing gas port 23 communicating with the first water-containing gas supply passage Qa, and a second water-containing gas port 24 communicating with the second water-containing gas supply passage Qb.

Although illustration is omitted in the drawings, the first dry gas (air) pressurized by a compressor (not shown) is supplied to the first dry gas port 21, and the second dry gas (cathode gas) humidified by the humidifying modules Aw is supplied from the second dry gas port 22 to the fuel cell cell. The first water-containing gas (air: referred to as "cathode off-gas") discharged from the fuel cell cell is supplied to the first water-containing gas port 23, and the second water-containing gas deprived of water by the humidifying modules Aw is discharged from the second water-containing gas port 24.

Figure 4:
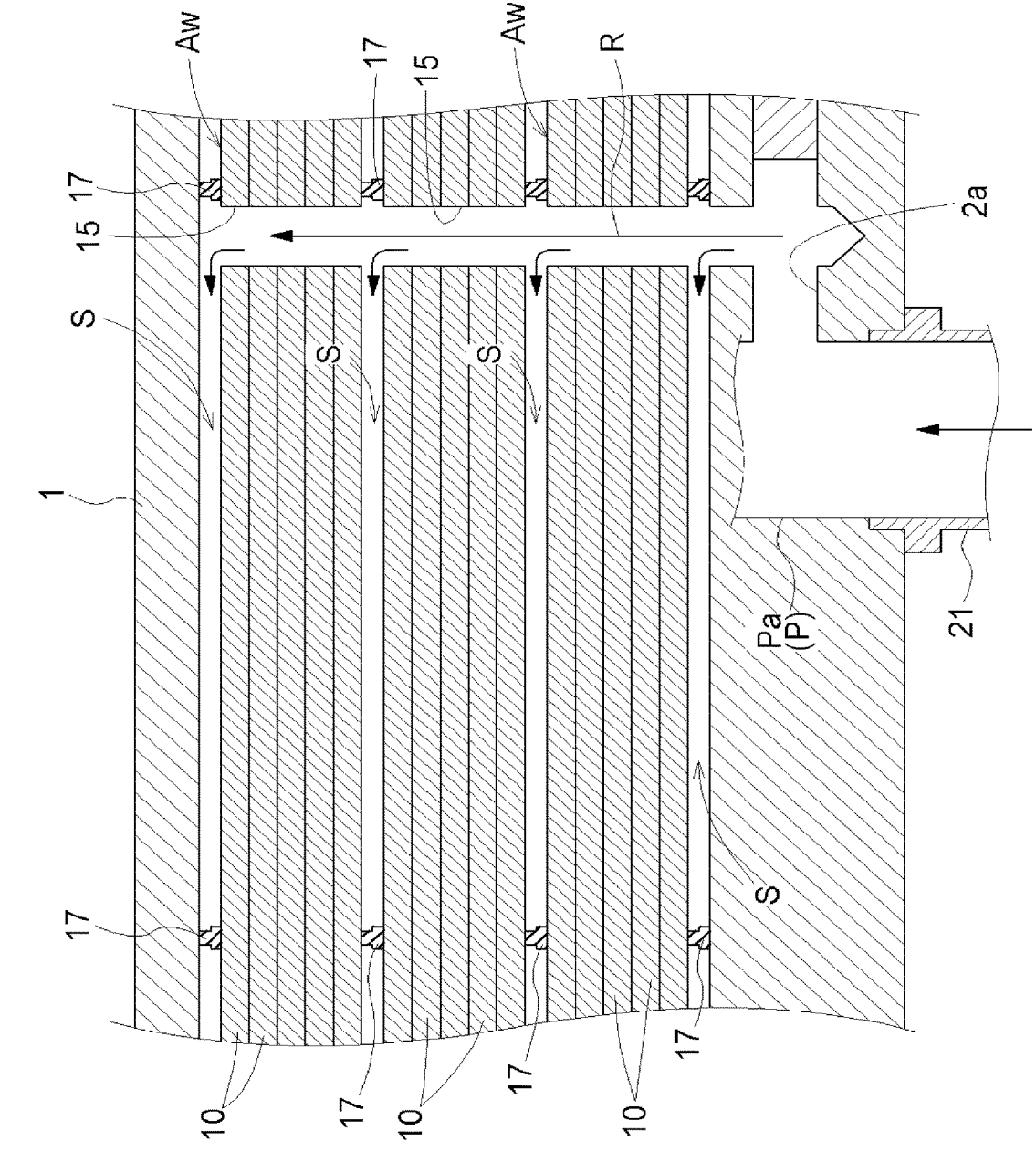
FIG. 4 is a sectional view showing the structure of a region extending from a pressurized gas supply passage to a pressurization space.

In particular, as shown in FIGS. 1 and 4, the humidifier A has a pressurized gas supply passage R vertically passing through the plurality of humidifying modules Aw. The pressurized gas supply passage R (example of a pressurization channel) communicates with the first dry gas supply passage Pa through a communication passage 2a formed in the lower plate 2, and the first dry gas is supplied to pressurization spaces S. The pressurization space S is formed between the plurality of humidifying modules Aw to obtain a pressure for press-bonding the plurality of separators 10 in each of the plurality of humidifying modules Aw by circulating the first dry gas. The pressurized gas supply passage R and the structure related thereto will be described later.

[Humidifying Module]

Figure 6:
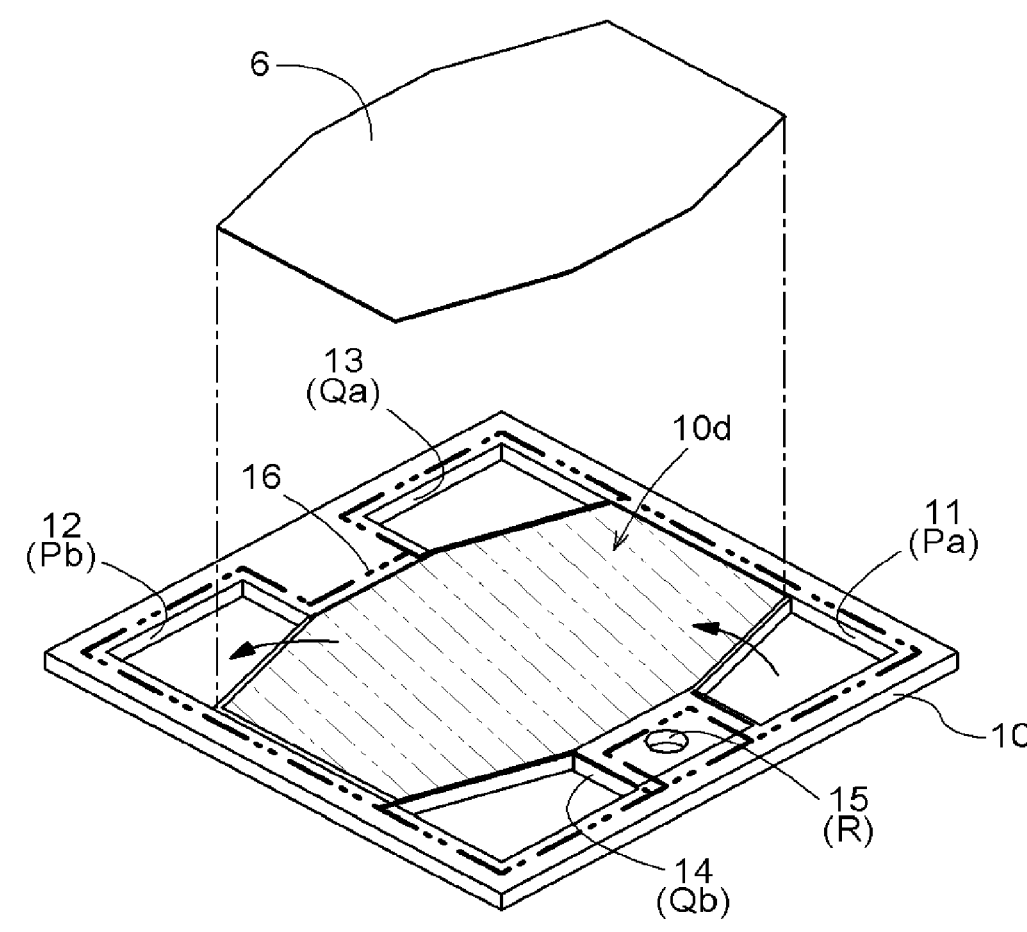
FIG. 6 is a perspective view showing the structure of the upper surface of the separator and a water exchange membrane.
Figure 7:
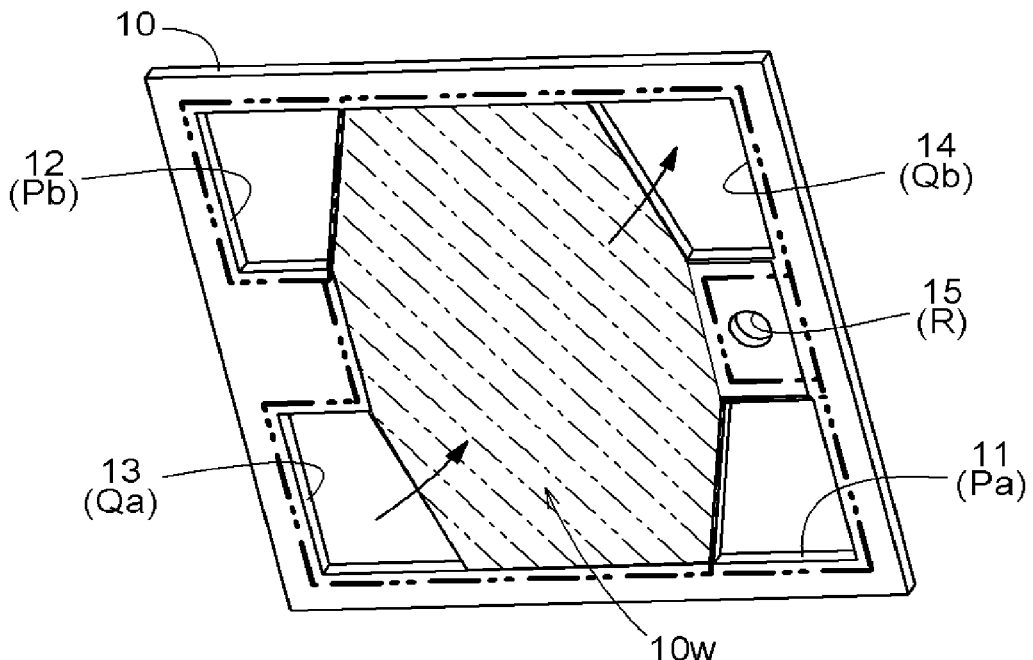
FIG. 7 is a perspective view showing the structure of the lower surface of the separator.

As shown in FIGS. 6 and 7, the separator 10 is shaped like a square plate molded from a resin. The separator 10 has the dry gas-side water exchange portion 10d on one surface, and the water-containing gas-side water exchange portion 10w on the other surface. The separator 10 has a first dry gas supply port 11, a second dry gas supply port 12, a first water-containing gas supply port 13, and a second water-containing gas supply port 14 formed as through holes at four corners. A pressurized gas supply hole 15 is drilled at a portion near the first dry gas supply port 11 on the outer periphery.

As shown in FIGS. 6 and 7, the separator 10 is shaped such that the shape of the dry gas-side water exchange portion 10d in plan view with the dry gas-side water exchange portion 10d disposed on the upper side is the same as the shape of the water-containing gas-side water exchange portion 10w in the plan view with the separator 10 flipped so that the right and left are reversed. In the state in which the plurality of separators 10 is stacked, a water exchange membrane 6 is sandwiched at a boundary between the dry gas-side water exchange portion 10d and the water-containing gas-side water exchange portion 10w.

On one side of the separator 10 shown in FIG. 6, the dry gas flows through the first dry gas supply port 11, the dry gas-side water exchange portion 10d, and the second dry gas supply port 12 in this order. The water-containing gas flows through the first water-containing gas supply port 13, the water-containing gas-side water exchange portion 10w, and the second water-containing gas supply port 14 in this order.

That is, the first dry gas supply port 11 and the second dry gas supply port 12 are disposed diagonally on the separator 10 in plan view. Although detailed illustration is omitted in the drawings, the dry gas-side water exchange portion 10d has a plurality of ridges so that air flows evenly. Similarly, the first water-containing gas supply port 13 and the second water-containing gas supply port 14 are disposed diagonally. Although illustration is omitted in the drawings, the water-containing gas-side water exchange portion 10w has channels formed by a plurality of ridges so that air flows evenly.

In the humidifying module Aw, the separators 10 are stacked to form a manifold-shaped space in which the plurality of first dry gas supply ports 11 is arranged in the vertical direction. The first dry gas supply passage Pa is formed by this space. Similarly, the second dry gas supply passage Pb is formed by the plurality of second dry gas supply ports 12, the first water-containing gas supply passage Qa is formed by the plurality of first water-containing gas supply ports 13, and the second water-containing gas supply passage Qb is formed by the plurality of second water-containing gas supply ports 14. The pressurized gas supply passage R is formed by the plurality of pressurized gas supply holes 15.

As indicated by long dashed double-short, dashed lines in FIGS. 6 and 7, gaskets 16 are disposed on both surfaces of the separator 10. The gasket 16 prevents leakage of gas between the surface of the separator 10 and the water exchange membrane 6. The gasket 16 also prevents the occurrence of a case where the gas flowing through the first dry gas supply port 11, the second dry gas supply port 12, the first water-containing gas supply port 13, the second water-containing gas supply port 14, or the pressurized gas supply hole 15 leaks from the interface between the separators 10 adjacent in the stacking direction. The gasket 16 is made of a rubber or resin material having a smaller thickness in the stacking direction than a partition member 17 and a sealing member 18 described later.

As shown in FIGS. 2 and 3, the plurality of separators 10 and the plurality of water exchange membranes 6 interposed therebetween constitute one humidifying module Aw. In the humidifying module Aw, the plurality of separators 10 is integrated by bonding the outer peripheries of the separators 10 adjacent in the stacking direction with an adhesive or the like. The plurality of separators 10 need not essentially be bonded. For example, the plurality of separators 10 may be integrated by using a structure in which protrusions and recesses are fitted in the stacking direction, or by a heat welding technology.

[Humidifying Space]

In the humidifier A, the pressurized first dry gas (air) is supplied to the dry gas-side water exchange portion 10*d* through the first dry gas supply passage Pa. Therefore, the air may leak due to a lift of the water exchange membrane 6 caused by deformation of the separator 10 by the pressure applied to the dry gas-side water exchange portion 10*d* of the separator 10. To prevent such leakage, in the humidifier A, the pressurization spaces S are formed at positions where each of the plurality of humidifying modules Aw is vertically sandwiched. Therefore, pressures are applied to the separators 10 of each of the plurality of humidifying modules Aw in the stacking direction, thereby preventing the lift of the water exchange membrane 6.

As shown in FIGS. 2 and 3, in the humidifier A including the plurality of (three) humidifying modules Aw, the separator 10 at the upper end of each humidifying module Aw has a flat upper surface. Similarly, the separator 10 at the lower end also has a flat lower surface. That is, neither the dry gas-side water exchange portion 10*d* nor the water-containing gas-side water exchange portion 10*w* is formed on the outer surface of the separator 10 positioned at the end of the humidifying module Aw in the stacking direction.

With such a structure, as shown in FIGS. 2 to 4 and 8, a partition member 17 made of a sealing material is provided in a fixed state on the upper surface of the separator 10 at the upper end of the humidifying module Aw. Further, sealing members 18 made of the same sealing material as the partition member 17 are provided in a fixed state so as to individually surround the first dry gas supply port 11, the second dry gas supply port 12, the first water-containing gas supply port 13, and the second water-containing gas supply port 14.

Similarly, as shown in FIGS. 2 to 4 and 5, a partition member 17 made of a sealing material using a flexible material such as rubber is provided in a fixed state on the upper surface of the lower plate 2. Further, sealing members 18 made of the same sealing material as the partition member 17 are provided in a fixed state so as to individually surround the first dry gas supply port 11, the second dry gas supply port 12, the first water-containing gas supply port 13, and the second water-containing gas supply port 14.

Each partition member 17 is disposed in a closed loop shape in plan view. The pressurization space S is formed in the loop-shaped space. The pressurized gas supply passage R communicates with the pressurization space S. That is, the partition member 17 functions to guide the pressurized gas from the pressurized gas supply passage R into the pressurization space S and to seal the pressurized gas inside the pressurization space S. The sealing member 18 prevents leakage of gas from each supply port.

The sealing material used for the partition member 17 has a protruding cross section as shown in FIG. 2. A base portion 17*a* and a protruding portion 17*b* are integrally formed by an adhesive material such as rubber. The base portion 17*a* is fixed to, for example, the upper surface of the separator 10 with an adhesive. As a result, for example, when a pressure is applied in the vertical direction (stacking direction), the protruding portion 17*b* is elastically deformed in the compression direction, thereby suppressing an inconvenience of significant deformation of the entire partition member 17 and maintaining good sealing performance. The sectional shape of the partition member 17 is not limited to the shape shown in FIG. 2, and may be, for example, a trapezoidal shape. For example, a recessed groove may be formed on the surface of the separator 10, and a part of the base portion 17*a* of the partition member 17 may be fitted into the groove. The sealing material used for the sealing member 18 also has a sectional shape in common with that of the sealing material used for the partition member 17.

Figure 8:
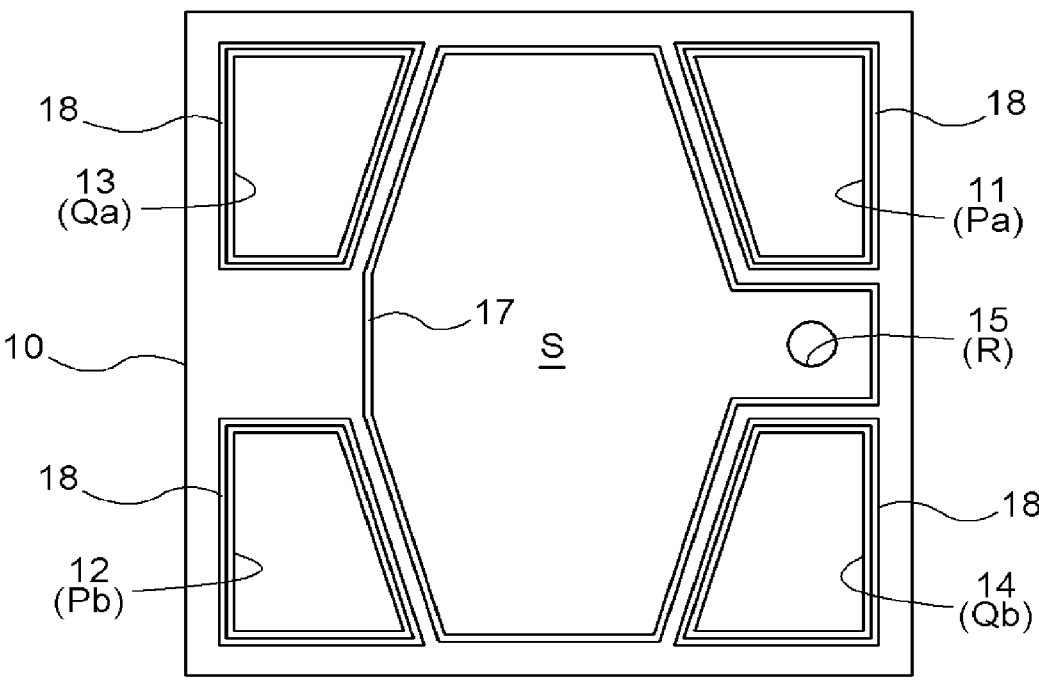
FIG. 8 is a plan view of the separator at the upper end of a humidifying module.

Although the partition member 17 and the sealing members 18 are disposed so as to be separated from each other in FIGS. 5 and 8, they may be formed integrally. The partition member 17 and the sealing members 18 need not be fixed with the adhesive, but may be fixed by baking.

By providing the partition member 17 and the sealing members 18 having the same sectional shape on the upper surface of the separator 10 at the upper end of the humidifying module Aw, the position of the protruding end of the partition member 17 for forming the pressurization space S and the positions of the protruding ends of the sealing members 18 in the regions surrounding the first dry gas supply port 11, the second dry gas supply port 12, the first water-containing gas supply port 13, and the second water-containing gas supply port 14 are aligned with each other, and the partition member 17 and the sealing members 18 abut evenly against the lower surface of the upper plate 1. Thus, good sealing can be achieved.

In this way, the pressurization space S is formed between the lower surface of the upper plate 1 and the upper surface of the separator 10 at the upper end of the humidifying module Aw at the uppermost end in the region inside the partition member 17 on the upper surface of the separator 10. Further, the pressurization space S is formed between the upper surface of the separator 10 at the upper end of the humidifying module Aw and the lower surface of the separator 10 facing the separator 10 at the upper end in the region inside the partition member 17 on the upper surface of the separator 10. Still further, the pressurization space S is formed between the upper surface of the lower plate 2 and the lower surface of the separator 10 at the lower end of the humidifying module Aw at the lowermost end in the region inside the partition member 17 on the upper surface of the lower plate 2. The humidifier A need not have the plurality of pressurization spaces S, and may have only one pressurization space S.

[Gas Flow]

In the humidifier A, as shown in FIG. 2, the first dry gas flows from the first dry gas port 21 to the first dry gas supply passage Pa, and flows from the first dry gas supply ports 11 of the plurality of separators 10 to the dry gas-side water exchange portions 10*d*. Further, the dry gas flows, as the second dry gas, from the second dry gas supply ports 12 to the second dry gas supply passage Pb, and is sent out from the second dry gas port 22 to the fuel cell cell.

When the dry gas flows in this way, the dry gas-side water exchange portion 10*d* is supplied with water in the water-containing gas flowing through the water-containing gas-side water exchange portion 10*w* via the water exchange membrane 6. As a result, the second dry gas contains a large amount of water.

As shown in FIG. 4, a part of the first dry gas is supplied to the pressurized gas supply passage R via the communication passage 2*a*, and the pressure of the first dry gas is applied to the plurality of pressurization spaces S from the pressurized gas supply passage R. Therefore, pressures are applied to the plurality of humidifying modules Aw in the vertical direction. The pressures applied in this way act in a direction in which the plurality of separators 10 constituting the humidifying module Aw comes into press contact with each other. Therefore, even in a situation in which the pressure of the dry gas supplied to the separators 10 acts in a direction in which the adjacent separators 10 are separated from each other, the separators 10 come into press contact with each other to suppress the lift of the water exchange membrane 6, thereby suppressing leakage of gas.

[Functions and Effects of Embodiment]

As described above, the humidifier A is structured by stacking the plurality of humidifying modules Aw, the pressurized gas supply passage R is formed through the humidifying modules Aw in the stacking direction, the pressurization spaces S are formed on both upper and lower sides of each of the humidifying modules Aw, and the fluid from the pressurized gas supply passage R is supplied to the pressurization spaces S. As a result, it is possible to apply pressures to the humidifying module Aw so as to compress it from the upper and lower sides. For example, even if the positional relationship of the separators 10 at the stacking position changes due to thermal expansion caused by a temperature rise, the lift of the plurality of separators 10 constituting the humidifying module Aw and the water exchange membranes 6 sandwiched between the separators 10 is prevented, thereby preventing air leakage from between the separator 10 and the water exchange membrane 6 and maintaining good humidification.

To form the pressurization space S, for example, the partition member 17 made of a flexibly deformable sealing material such as rubber is provided on the upper surface of the separator 10. Thus, the pressurization space S is formed, for example, between the upper surface of the separator 10 and the upper plate 1 without specially forming a space to be supplied with a fluid. Accordingly, the wide surface of the separator 10 can be pressurized.

Further, the pressurized gas supply passage R communicating with the pressurization spaces S is formed and a part of the dry gas to be supplied to the first dry gas supply passage Pa is supplied to the pressurized gas supply passage R. Thus, there is no need to provide a mechanism for specially generating the pressurized gas.

In the humidifier A, the plurality of humidifying modules Aw having the common structure is used and disposed into a stack. Therefore, the partition member 17 is provided on the upper surface of the separator 10 at the upper end of each humidifying module Aw, the partition member 17 is provided on the upper surface of the lower plate 2, and the dry gas is supplied to the pressurization spaces S. Thus, pressures can individually be applied to the plurality of humidifying modules Aw so as to compress them in the vertical direction. As a result, gas leakage can be suppressed by applying uniform pressures to the plurality of separators 10 without causing an inconvenience such as insufficient pressure applied to the separators 10 at the intermediate parts in the stacking direction.

When the partition member 17 on the upper surface of the separator 10 at the upper end of the humidifying module Aw is taken as an example, the sealing members 18 having the same sectional shape as the partition member 17 are provided in the regions surrounding the first dry gas supply port 11, the second dry gas supply port 12, the first water-containing gas supply port 13, and the second water-containing gas supply port 14. Thus, good sealing performance is achieved because the positions of the protruding ends of the sealing members 18 surrounding the four supply ports and the position of the protruding end of the partition member 17 for forming the pressurization space S are aligned with each other.

[Other Embodiments]

The present disclosure may be structured as follows in addition to the above embodiment (components having the same functions as those of the embodiment are denoted by the same numerals or signs as those of the embodiment).

Figure 9:
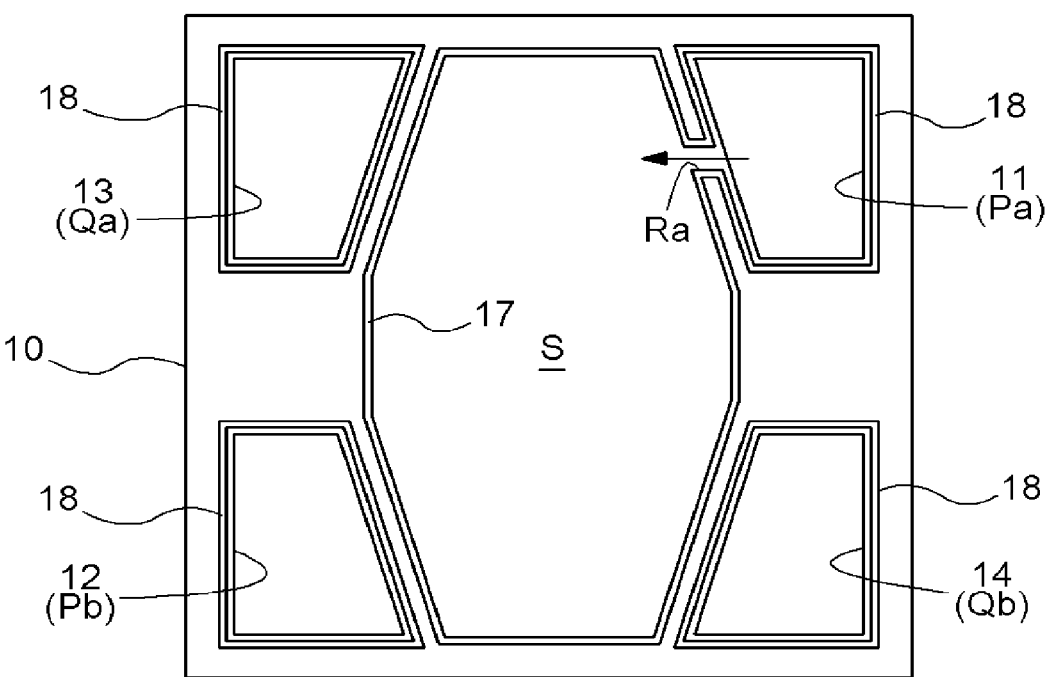
FIG. 9 is a plan view of a separator of another embodiment (a).

(a) Dry gas may be used as the fluid to be supplied to the pressurization space S. FIG. 9 shows an example thereof. In the other embodiment (a), a pressurized gas branch channel Ra (example of the pressurization channel) is formed such that a part of the dry gas to be supplied to the first dry gas supply passage Pa is supplied from the first dry gas supply port 11 to the pressurization space S inside the partition member 17.

Figure 10:
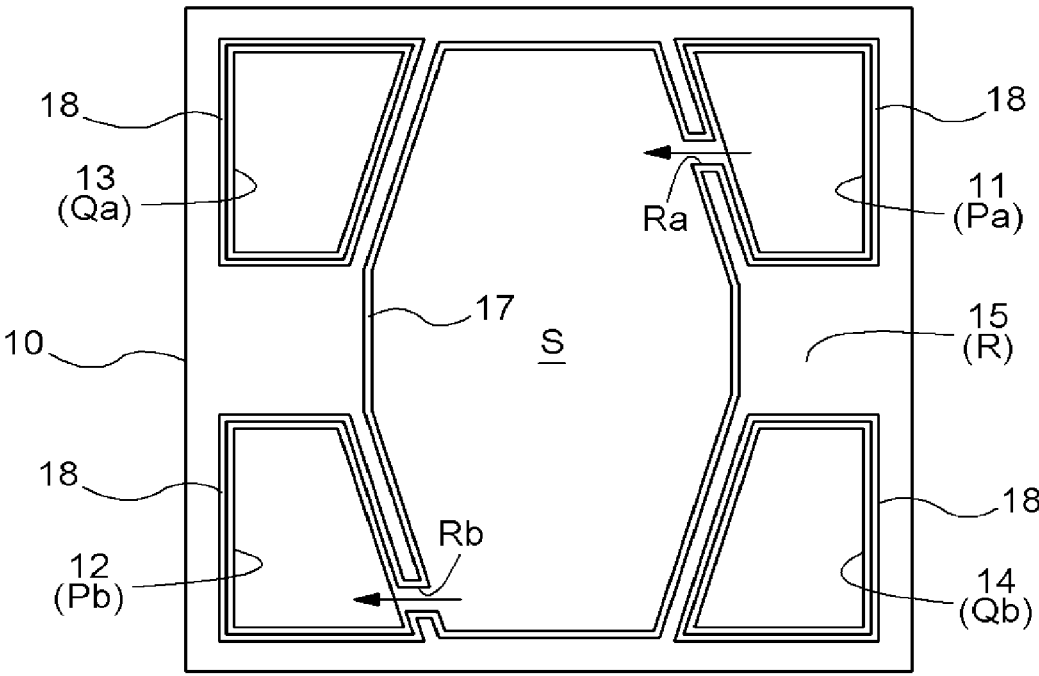
FIG. 10 is a plan view of a separator of a modification of the other embodiment (a).

FIG. 10 shows a modification of the other embodiment (a). In this modification, a pressurized gas discharge passage Rb (example of a discharge portion) is formed such that the dry gas supplied to the pressurization space S inside the partition member 17 is sent out to the second dry gas supply port 12. Thus, the dry gas can be supplied to and discharged from the pressurization space S at the same time.

Figure 11:
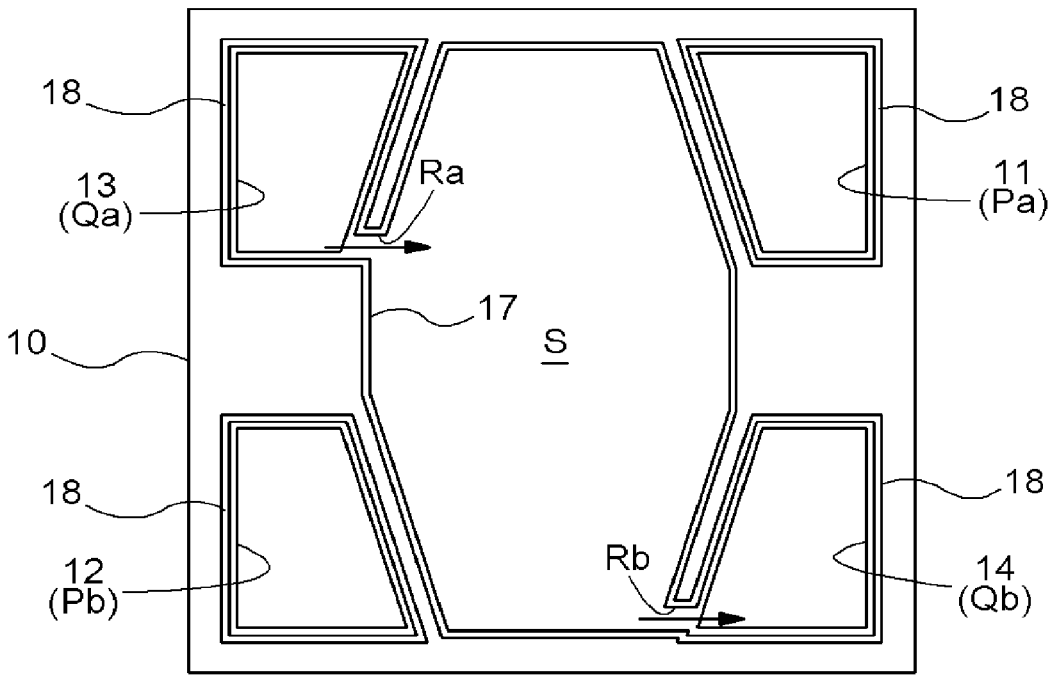
FIG. 11 is a plan view of a separator of another embodiment (b).

(b) Water-containing gas may be used as the fluid to be supplied to the pressurization space S. FIG. 11 shows an example thereof. In the other embodiment (b), a pressurized gas branch channel Ra (example of the pressurization channel) is formed such that a part of the water-containing gas to be supplied to the first water-containing gas supply passage Qa is supplied from the first water-containing gas supply port 13 to the pressurization space S inside the partition member 17. In FIG. 11, similarly to the modification of the other embodiment (a) described above, a pressurized gas discharge passage Rb (example of the discharge portion) is formed such that the water-containing gas supplied to the pressurization space S is sent out to the second water-containing gas supply port 14. Thus, the water-containing gas can be supplied to and discharged from the pressurization space S at the same time. In the structure of the other embodiment (b), the pressurized gas discharge passage Rb need not essentially be formed.

(c) The fluid to be supplied to the pressurization space S may be, for example, air pressurized by a compressor or gas different from the dry gas or the water-containing gas, such as nitrogen gas dedicated to pressurization.

(d) The fluid to be supplied to the pressurization space S is not limited to gas, and may be liquid such as water or oil. When liquid is used, for example, a structure for applying a spring pressure to the liquid or an accumulator for applying a pressure may be used to avoid the use of an actuator such as a compressor.

(e) The humidifier A is not limited to the structure including the plurality of humidifying modules Aw, and may include a single humidifying module Aw. In the humidifier A including the plurality of humidifying modules Aw, the number of separators constituting each of the plurality of humidifying modules Aw may vary.

(f) For example, a conduit for communicating the first dry gas supply passage Pa and the pressurized gas supply passage R may be formed outside the lower plate 2 in place of the structure including the communication passage 2a for supplying the first dry gas to the pressurized gas supply passage R. Further, the communication conduit may be formed for each of the plurality of humidifying modules Aw.

(g) A discharge portion for discharging gas from the pressurization space S is formed in the separator 10. By forming the discharge portion in this way, the fluid (pressurized gas) supplied to the pressurization space S can be discharged to the outside via the discharge portion. In the structure in which the dry gas is supplied to the pressurization space S, the dry gas discharged from a discharge port may be supplied to the separator 10 as the first dry gas. Further, it is possible to reduce a phenomenon in which an excessive pressure is applied to the pressurization space S. In this structure, it is assumed that the sectional area of the channel for supplying the dry gas or the like to the pressurization space S is equal to the sectional area of the channel of the discharge portion. The sectional area of the channel of the discharge portion may be set smaller.

(h) A plurality of pressurized gas supply passages R is provided. It is assumed that through holes are formed in the separator 10 to form the plurality of pressurized gas supply passages R. A plurality of conduits may be provided outside the separator 10.

INDUSTRIAL APPLICABILITY

The present disclosure is applicable to a humidifier structured such that a plurality of separators is stacked.

DESCRIPTION OF THE REFERENCE NUMERALS 6 water exchange membrane
10 separator
10d dry gas-side water exchange portion
10w water-containing gas-side water exchange portion
17 partition member Aw humidifying module
P dry gas supply passage
Q water-containing gas supply passage
R pressurized gas supply passage (pressurization channel)
Rb pressurized gas discharge passage (discharge portion)
S pressurization space

The invention claimed is:

1. A humidifier comprising:
a dry gas supply passage through which dry gas flows;
a water-containing gas supply passage through which water-containing gas flows;
separators each including a dry gas-side water exchange portion formed on one side and communicating with the dry gas supply passage, and a water-containing gas-side water exchange portion formed on the other side and communicating with the water-containing gas supply passage;
humidifying modules in each of which a plurality of the separators is vertically stacked, the humidifying modules each including a water exchange membrane disposed between the dry gas-side water exchange portion and the water-containing gas-side water exchange portion facing each other in adjacent separators in a state in which the separators are vertically stacked;
a partition member that forms a pressurization space at positions between adjacent humidifying modules that are vertically stacked to guide a fluid into the pressurization space; and
a pressurization channel vertically passing through each of the humidifying modules and communicating with the pressurization space to supply the fluid.

2. The humidifier according to claim 1, wherein the fluid is the water-containing gas supplied to the water-containing gas supply passage or the dry gas supplied to the dry gas supply passage.

3. The humidifier according to claim 1, wherein the water-containing gas supply passage or the dry gas supply passage communicates with the pressurization channel through which pressurized gas is supplied to the pressurization space as the fluid.

4. The humidifier according to claim 3, wherein the pressurization channel through which the pressurized gas is supplied to the pressurization space is formed in the separators.

5. The humidifier according to claim 1, wherein a discharge portion for discharging the fluid guided to the pressurization space is formed in the separators.

6. The humidifier according to claim 1, wherein the partition member is disposed on an outer surface of the humidifying modules and has a protruding cross section formed by a base portion and a protruding portion.

* * * * *